Patented Aug. 24, 1943

2,327,501

UNITED STATES PATENT OFFICE 2,327,501

DRILLING FLUID

Thomas S. Chapman, Houston, Tex., assignor to Standard Oil Development Company, a corporation of Delaware No Drawing. Application December 5, 1940, Serial No. 368,622

18 Claims. (Cl. 252—8.5)

The present invention is directed to drilling fluids, and particularly to drilling fluids which are made up with saline waters.

One of the most vexing problems in the drilling of oil wells, particularly those which go to great depths, is the prevention of loss of water from the drilling fluid. Water has a tendency to penetrate porous formations. The ordinary oil well passes through a great many of these formations so that in the course of drilling a deep oil well loss of water from the mud is considerable. The importance of the problem, and a laboratory method for determining the filtration properties of drilling muds are discussed in a paper entitled "Evaluation of filtration properties of drilling muds," by Milton Williams and G. E. Cannon, published in the 1938 volume of "Drilling and Production Practice," by the American Petroleum Institute, beginning on page 20.

There are several reasons why the loss of water into porous formations is undesirable and harmful. If the porous formation contains oil, the water impedes the flow of oil into the well and results in the completion of a much poorer well than if the water were not lost into the oil-bearing rock. Since electrical logs are influenced to a large extent by the fluid content of the rock, the change in composition of the fluid within the pore space of rock as a result of filtration may often result in serious errors in electrical logs. In some cases the water loss into the sands may lead to erroneous results on drill stem tests. The loss of excessive quantities of water results in the building up of a thick filter cake of mud solids on the borehole wall. This condition results in the hole being tight, and sometimes causes the drill pipe to become stuck.

The problem of mud filtration control is particularly important and difficult in areas in which salt water must be used for the drilling mud, as in marine operations or where thick salt beds must be penetrated, as in west Texas. The salt flocculates ordinary drilling muds and causes the filtration of water to occur at excessive rates. Thus, drilling muds which are not subject to excessive filtration losses in fresh water are useless when the water becomes saturated with salt. Likewise, some addition agents, such as bentonite, which tend to decrease filtration in fresh water muds, are wholly useless for this purpose in salt water muds.

The object of the present invention is the production of a salt water drilling mud in which the loss of water by filtration is reduced to a minimum.

It has already been proposed to reduce water-loss by filtration in salt water drilling muds by the addition of proteins to such muds. It has now been found that the degree of reduction of water-loss by filtration can be increased by using tanning agents in conjunction with the proteins. Proteins which have been proposed are substances such as casein, gelatine, blood meal, fish meal, albumin, and salts of proteins such as sodium caseinate, and casein hydrochloride. These substances may be pretreated with tanning agents such as chrome-alum or formaldehyde, or substances of the latter class can be added to the drilling mud conjointly with the proteins.

In the practice of the present invention, the protein is used usually in amounts not exceeding 5% of the weight of the mud, and the tanning agent is used in an amount preferably not exceeding about 50% by weight of the protein. Very good results are obtained by using protein in an amount equal to 2% by weight of the drilling mud and tanning agent in an amount equal to 0.2%. These figures are for gelatine and chrome-alum, and will vary with other proteins and tanning agents. The minimum amount of tanning agent which is effective may be stated to be about 2% by weight of the protein.

As previously stated, the protein and tanning agent may be pre-mixed or may be added separately to the drilling fluid. In any case, the treating agent may be added to the mud in the ditch, in the mixing hopper, or in the settling pit in the desired proportions. A mud gun may be used to increase the uniformity of the mixture.

In order to illustrate the nature and magnitude of the effect produced by the addition of agents of the type aforedescribed on the filtration characteristics of the mud, the results obtained by using gelatine and chrome-alum may be mentioned. A mud was made up with saturated salt water and 20% by weight of Shafter Lake clay. The filtration characteristics of this mud without any addition agent with gelatine and with gelatine and chrome-alum were determined in a Baroid low-pressure wall-building tester (described in Drilling Mud, May, 1938) and a pressure of 100#/in.$^2$ was applied to the mud. In each case a 300-gram sample of the mud was used. The filtration characteristic was determined by measuring the amount of filtrate obtained over a period of 30 minutes. The drilling mud without any addition agent yielded 110 cc. of filtrate in 30 minutes. With 2% gelatine, the amount of filtrate was reduced to 17 cc. With 2% of gelatine and .2% of chrome-alum, the filtrate was reduced to 7 cc.

Results of an even more striking nature were obtained with casein as the protein. In this case the mud was a saturated salt water containing 20% by weight of El Paso clay. This mud on the filter test yielded 70 cc. of filtrate in 30 minutes. With the addition of 5% by weight of casein and 0.5% chrome-alum and 0.5% by weight of sodium-hydroxide, the filtrate was reduced to 3.4 cc.

When in the appended claims the expression "non-acidic tanning agent" is employed it is intended to exclude tannin, which yields results substantially inferior to those obtained with tanning agents such as chrome-alum and formaldehyde.

The nature and objects of the present invention having been thus described, what is claimed as new and useful and is desired to be secured by Letters Patent is:

1. A method for reducing the filtration of water from a salt water drilling fluid into porous formations traversed by a drill hole which comprises adding to the drilling fluid a tanning agent and a substance selected from the group consisting of proteins and salts of proteins.

2. A method according to claim 1 in which the quantiy of protein or protein salt employed is not in excess of 5% by weight of the drilling fluid, and the amount of tanning agent employed is less than 50% by weight of the protein or protein salt.

3. A method for reducing the filtration of water in a salt water drilling fluid into porous formations traversed by a drill hole, which comprises adding to the drilling fluid a non-acidic tanning agent and a substance selected from the group consisting of proteins and salts of proteins.

4. A method according to claim 3 in which the tanning agent is chrome-alum and the protein substance is casein.

5. A method according to claim 3 in which the tanning agent is chrome-alum and the protein substance is gelatine.

6. A drilling fluid comprising a salt water dispersion of a tanning agent and a substance selected from the group consisting of proteins and salts of proteins.

7. A drilling fluid comprising a salt water dispersion of a non-acidic tanning agent and a substance selected from the group consisting of proteins and salts of proteins.

8. A drilling fluid comprising a salt water suspension of clay having dispersed therein a tanning agent and a substance selected from the group consisting of proteins and salts of proteins.

9. A drilling fluid comprising a salt water dispersion of clay having idspersed therein a non-acidic tanning agent and a substance selected from the group consisting of proteins and salts of proteins.

10. A drilling fluid according to claim 7 in which the protein substance constitutes less than 5% by weight of the drilling fluid, and the tanning agent is present in an amount less than 50% by weight of the protein.

11. A drilling fluid according to claim 9 in which the protein substance constitutes less than 5% by weight of the drilling fluid, and the tanning agent is present in an amount less than 50% by weight of the protein.

12. A drilling fluid according to claim 7 in which the tanning agent is chrome-alum.

13. A drilling fluid according to claim 8 in which the tanning agent is chrome-alum.

14. A drilling fluid according to claim 9 in which the tanning agent is chrome-alum.

15. A drilling fluid according tao claim 7 in which the tanning agent is chrome-alum and the protein substance is casein.

16. A drilling fluid according to claim 7 in which the tanning agent is chrome-alum and the protein substance is a gelatine.

17. A drilling fluid according to claim 9 in which the tanning agent is chrome-alum and the protein substance is casein.

18. A drilling fluid according to claim 9 in which the tanning agent is chrome-alum and the protein substance is gelatine.

THOMAS S. CHAPMAN.